United States Patent
Rao et al.

(10) Patent No.: US 11,330,228 B1
(45) Date of Patent: May 10, 2022

(54) PERCEIVED CONTENT QUALITY THROUGH DYNAMIC ADJUSTMENT OF PROCESSING SETTINGS

(71) Applicant: Amazon Technologies, Inc., Seattle, WA (US)

(72) Inventors: Siddhartha Shankara Rao, Seattle, WA (US); John Joseph Dunne, Bremertom, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/219,055

(22) Filed: Mar. 31, 2021

(51) Int. Cl.
*H04N 7/15* (2006.01)

(52) U.S. Cl.
CPC ..................... *H04N 7/15* (2013.01)

(58) Field of Classification Search
CPC .......... H04N 7/15; H04N 7/147; H04N 7/152; H04L 65/80; G06T 2207/30168
USPC ........................................... 348/14.01–14.16
See application file for complete search history.

(56) References Cited

U.S. PATENT DOCUMENTS

| | | | | |
|---|---|---|---|---|
| 8,587,630 | B1* | 11/2013 | Krinsky | H04N 17/00 348/14.02 |
| 10,250,872 | B2* | 4/2019 | Karimi-Cherkandi | H04N 7/025 |
| 2005/0081160 | A1* | 4/2005 | Wee | H04H 60/33 715/755 |
| 2011/0069142 | A1* | 3/2011 | Ali | H04N 21/6377 348/14.12 |
| 2018/0027032 | A1* | 1/2018 | Carter | H04L 65/4015 370/260 |
| 2018/0359411 | A1* | 12/2018 | Kohstall | H04N 5/23222 |
| 2019/0080474 | A1* | 3/2019 | Lagun | G06F 3/013 |
| 2019/0082276 | A1* | 3/2019 | Crow | H04R 25/50 |
| 2019/0339581 | A1* | 11/2019 | Jovanovic | G06F 3/147 |
| 2019/0394253 | A1* | 12/2019 | Gharbi | H04L 65/608 |
| 2020/0084367 | A1* | 3/2020 | Amini | H04N 5/23225 |
| 2020/0314437 | A1* | 10/2020 | Smole | H04N 19/103 |

* cited by examiner

*Primary Examiner* — Melur Ramakrishnaiah
(74) *Attorney, Agent, or Firm* — BakerHostetler

(57) ABSTRACT

Implementations for selecting processing settings based on a device characteristic are described. A content signal, such as an audio signal or a video signal, is received. A characteristic of an input device and/or an output device is then determined and one or more processing settings for processing the content signal are determined based on the characteristic of the input device and/or the output device. The content signal is then processed based on the one or more settings and the processed content signal is sent for output. Feedback regarding the quality of the processed content signal is received. If the quality of the processed content signal is unacceptable, then one or more of the signal processing settings can be changed by deactivating a setting or changing a parameter of a setting.

20 Claims, 8 Drawing Sheets

PERCEIVED CONTENT QUALITY THROUGH DYNAMIC ADJUSTMENT OF PROCESSING SETTINGS

BACKGROUND

Devices and service providers use a number of different components to improve the quality of the content. For example, content capturing hardware, such as a microphone or a camera, and content output hardware, such as a speaker or display, can include their own components to improve content quality. Such components can include audio processing, such as noise cancellation, or video processing, such as contrast correction. Service providers can also include components to improve the quality of the content received from the capturing hardware and sent to the output hardware. For example, a cloud-based conference service can perform noise cancellation on audio received from participants in the conference.

However, if a content signal is overprocessed, such as by applying the same type of component to a content signal repeatedly, the quality of the content can be degraded. For example, noise suppression performed on an audio signal can cause the audio signal to appear digitized. The greater the number of times the noise suppression is performed, such as once at the capturing hardware, again by the service provider, and yet again by the output hardware, the greater the digitization of the audio signal. Therefore, to improve content quality for different input and output hardware combinations, there is a need to determine optimal content processing settings for those combinations.

BRIEF DESCRIPTION OF THE DRAWINGS

The detailed description is set forth below with reference to the accompanying figures. The use of the same reference numbers in different figures indicates similar or identical items. The systems depicted in the accompanying figures are not to scale and components within the figures may be depicted not to scale with each other.

DETAILED DESCRIPTION

Figure 1:
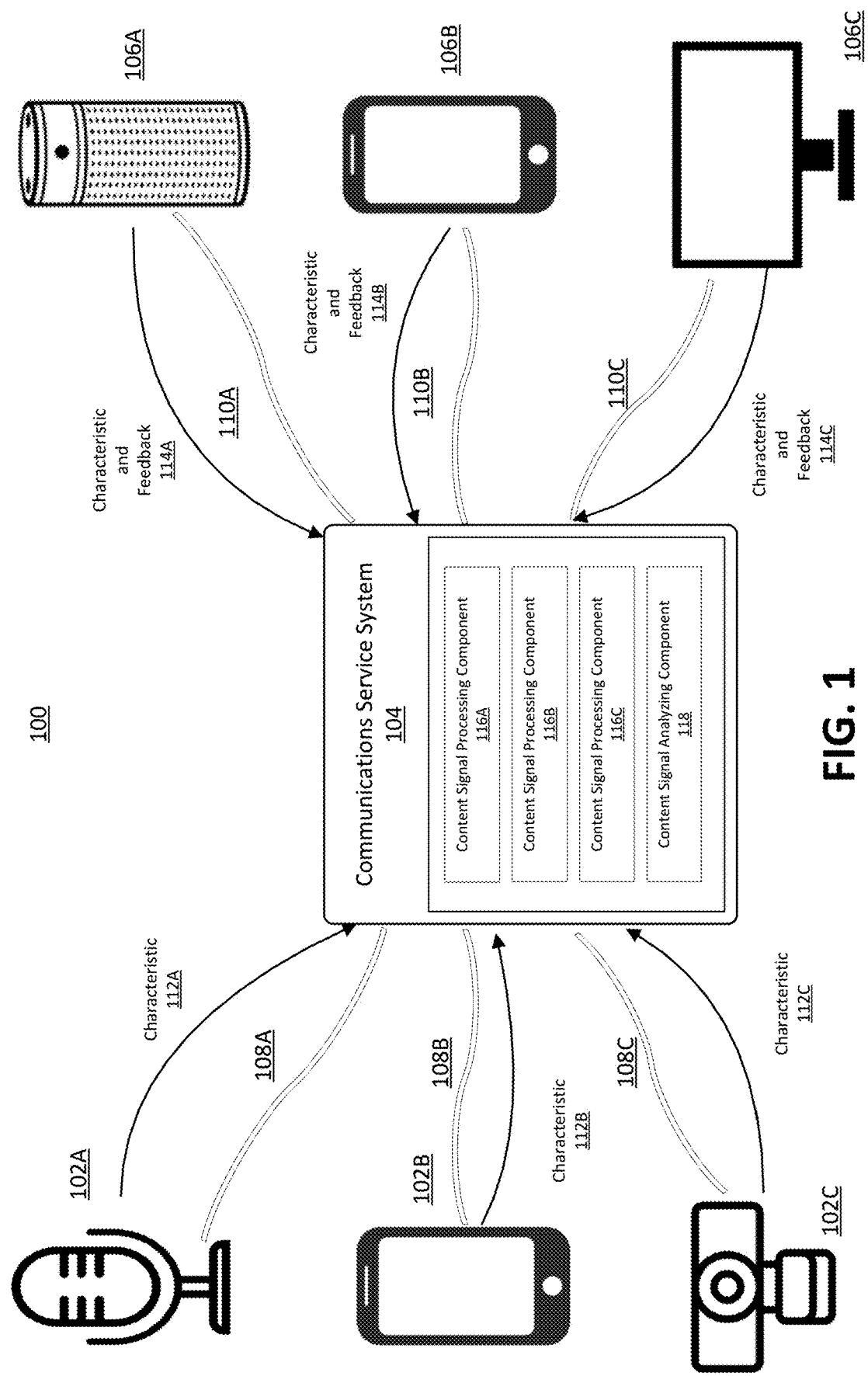
FIG. 1 schematically illustrates a high-level architecture of a communications service system in a service provide network.

Techniques and architecture for selecting settings for processing a content signal based on a combination of devices receiving and outputting the content are described. The received content signal can be processed in a network service, e.g., media conferencing service, file hosting service, interactive electronic gaming service, etc., where participants of the network service are located in different locations. A content signal, such as an audio signal or a video signal, can be received from an input device of a participant, then processed by the network service, and finally transmitted to an output device. Each of the input device, the output device, and the network service can include one or more components for processing the content signal to improve quality of the content. The components can be, for example, filters and encoders. For example, the components can be a noise cancellation filter, an echo cancellation filter, a reverberation filter, a voice filter, an audio encoder, a lighting filter, a focus filter, a crop filter, a framerate filter, a color filter, a smoothing filter, and/or a video encoder.

Various input devices and output devices each include different components to process content signals. Because it may not be possible to know what components are included in each input device and output device, the network service may not know which processing settings will result in optimal content quality for a specific input and output device combination. Without knowing the specific components used by each input device, each output device, or combinations thereof, the network service can rely on subjective user feedback, objective feedback, and user selected component settings to determine optimal processing settings for a particular input device, a particular output device, or combinations thereof.

For example, a network service can receive a characteristic of the input device, a characteristic of the output device, or both characteristics of the input and output devices. The network service can then process the content signal based on initial settings for the components. The initial settings can be default settings for the network service or can be based on settings selected by users of devices having the same or similar characteristic in prior network services.

Following output of the content signal by the output device, feedback regarding the quality of the content can be requested from a user. The feedback can indicate whether output of the content is high or low, acceptable or unacceptable, or can indicate specific problems with the output of the content. The network service can then adjust one or more components based on the feedback for the particular combination of input and output devices in future network services. The adjustment of the one or more components can include enabling or disabling a component or adjusting a parameter of a component. The adjusted components may be used as default settings for future network services having the same or similar combination of input and output devices.

The components for processing the content signal for a particular input device, output device, or combination thereof can be selected based on heuristics applied to the subjective and/or objective feedback of the output of the content. The heuristics can include a weighted sum based on the source of the feedback and the usage of the network service. For example, the longer the content signal or the longer the usage of the network service, the greater the weight associated with the feedback. In some embodiments, the components for processing the content signal can be selected by a machine learning model that is trained with prior feedback metrics, operational constraints, and/or user preferences of completed network services.

Certain implementations and embodiments of the disclosure are described more fully below with reference to the accompanying figures, in which various aspects are shown. However, the various aspects may be implemented in many different forms and should not be construed as limited to the specific implementations described herein. The disclosure encompasses variations of the described embodiments.

FIG. 1 illustrates a high-level architecture 100 of a communications service system in a service provider network, according to an embodiment. One or more input devices 102A-C may provide content, such as audio signals and/or video signals 108A-C, to a communications service system 104. The communications services can be, for example, audio conferencing, video conferencing, chatting, gaming services, etc. The communications service system 104 can be implemented in one or more computing systems, such as one or more hosting servers, as explained in further detail below. The communications service system 104 can process the content received from the one or more input device 102A-C and output the processed content, such as the processed audio signals and/or video signals 110A-C, to one or more output devices 106A-C.

For example, the input device 102A can be a microphone, the input device 102B can be phone, such as a smartphone, and input device 102C can be a camera, such as a webcam. For example, the output device 106A can be a speaker, such as a wireless smart speaker, the output device 106B can be a phone, such as a smartphone, and the output device 106C can be a display, such as a television, monitor, projector, etc. Each of the input devices 102A-C can be associated with a different participant of a communications service or with the same participant of the communications service. Similarly, each of the output devices 106 A-C can be associated with a different participant of the communications service or with the same participant of the communications service. In some embodiments, all of the input devices 102A-C and the output devices 106A-C can be concurrently participating in the same communications service such that all of the input content signals 108A-C can be sent to each of the output devices 106A-C. In some embodiments, two or more of the input devices 102A-C can be at the same location and associated with the same user or computing node. Similarly, two or more of the output devices 106A-C can be at the same location and associated with the same user or computing node.

In some embodiments, each of the input content signals 108A-C can be sent to a corresponding output device 106A-C. For example, the audio signal 108A received from the microphone 102A can be processed by the communications service system 104 and sent to the smart speaker 106A. The audio or video signal 108B received from the smartphone 102B can be processed by the communications service system 104 and sent to the smartphone 106B. The video signal 108C received from the camera 102C can be processed by the communications service system 104 and sent to the display 106C.

The communications service system 104 may include one or more content signal processing components 116A-C for processing the content signals 108A-C received from the input devices 102A-C. Although three components 116A-C are shown in FIG. 1, the communications service system 104 can include any number of components. The components 116A-C can be, for example, filters and encoders for processing the content signals 108A-C. For example, each of the components 116 A-C can be a noise cancellation filter, an echo cancellation filter, a reverberation filter, a voice filter, an audio encoder, a lighting filter, a focus filter, a crop filter, a framerate filter, a color filter, a smoothing filter, and/or a video encoder. The components 116A-C can process one or more of the input content signals 108A-C and the communications service system 104 can then send the processed content signals 110A-C to one or more of the output devices 106A-C.

The communications service system 104 may also include a content signal analyzing component 118 that can objectively determine the quality of a content signal processed by one or more of the components 116A-C. The content signal analyzing component 118 can determine the quality of a content signal by analyzing the shape of the signal, the digitization of the signal, the framerate of the signal, the bit rate of the signal, etc.

In addition to the components 116A-C of the communication service system 104, each of the input devices 102A-C and the output devices 106A-C can include components for processing a content signal. For example, the microphone 102A may include a noise filtering component or an echo filtering component to process audio captured by the microphone 102A before the audio signal 108A is sent to the communication service system 104. Similarly, the smart speaker 106A can include a noise filtering component or an echo filtering component to process the already processed content signal 110A before the content is output. As such, content may be processed in three stages: first at the input device 102A-C, second at the communications service system 104, and third at the output device 106A-C. However, as explained above, redundant processing of the same type, or of different types, of a content signal may degrade the content signal such that the quality of the content is suboptimal or not acceptable to a user when output. For example, if the microphone 102A and the communications service system 104 both include a noise filtering component, then the quality of the output content signal 110A may sound too digitized or may not be suitable for speech recognition. Therefore, the quality of the output content signal 110A can be improved if the communications service system 104 disables a noise filtering component.

The communications service system 104 may not, however, know which components are included in each input device 102A-C and output device 106A-C in order to optimally set the components 105A-C. In addition, there are numerous combinations of input devices 102A-C and output devices 106A-C that each have specific component settings to improve content quality. Instead, the communications service system 104 may determine the optimal component settings based on feedback from users of the output devices 106A-C and/or from objective feedback from the content signal analyzing component 118 in the communications service system 104.

Specifically, the communications service system 104 can receive characteristics 112A-C from each of the input devices 102A-C. The characteristics 112A-C may be unique identifiers of the input devices 102A-C, identifiers of the make and/or model of the input devices 102A-C, identifiers of the firmware version of the input devices 102A-C, identifiers of the types of the input devices 102A-C, and/or indicators of whether the input devices 102A-C have certain components. The characteristics 112A-C may also include a type of connectivity of the input devices 102A-C to the communications service system 104. The characteristics 112A-C may also include may also include identifiers or a fingerprint of all of the input devices 102A-C at a single location, at a single computing node, or associated with the same user.

The characteristics 112A-C may include one or more characteristics of each input device 102A-C. For example, the characteristic 112A may indicate to the communications service system 104 that the microphone 102A is of a particular brand that is known to include a noise suppression component in its hardware. Upon reception up the characteristic 112A, the communications service system 104 may disable a component that performs noise suppression in order to prevent redundant noise suppression performed on the content signal 108A. In another example, the characteristic 112B may identify the smartphone 102B as a model that is known to include a plurality of components for improving content signals. The smartphone 102B may include a noise suppression filter, an echo cancellation filter, and a gain filter. Upon reception up the characteristic 112B, the communications service system 104 may disable all of the components 116A-C in order to prevent redundant processing performed on the content signal 108B. In yet another example, characteristic 112C may identify the webcam 102C as a model that is known not to include any components for audio signal processing. Upon reception up the characteristic 112C, the communications service system 104 may enable all of the components 116A-C in order to improve content quality of the content signal 108C. In still a further example, the characteristic 112A may indicate a particular microphone 102A that is known to have low capture volume. Upon reception of the characteristic 112A, the communications service system 104 may change a parameter of a gain component 116A-C to increase the volume of the content signal 108A. In another example, the characteristics 112A-C together may indicate characteristics of all of the input devices 102A-C available to a user.

In addition, the communications service system 104 can receive characteristics and feedback 114A-C from each of the output devices 106A-C. The characteristics 114A-C may be unique identifiers of the output devices 106A-C, identifiers of the make and/or model of the output devices 106A-C, identifiers of the firmware versions of the output devices 106A-C, identifiers of the types of the output devices 106A-C, and/or indicators of whether the output devices 106A-C have certain components. The characteristics 114A-C may also include a type of connectivity of the output devices 106A-C to the communications service system 104. The characteristics 114A-C may also include may also include identifiers or a fingerprint of all of the output devices 106A-C at a single location, at a single computing node, or associated with the same user.

The characteristics 114A-C may include one or more characteristics of each output devices 106A-C. For example, the characteristic 114A may indicate to the communications service system 104 that the smart speaker 106A is of a particular brand that is known to include an echo cancellation component in its hardware. Upon reception up the characteristic 114A, the communications service system 104 may disable a component that performs echo cancellation in order to prevent redundant processing performed on the content signal 110A. In another example, the characteristic 114B may identify the smartphone 106B as a model that is known to include a plurality of components for improving content signals. Upon reception up the characteristic 114B, the communications service system 104 may disable all of the components 116A-C in order to prevent redundant processing performed on the content signal 110B. In yet another example, characteristic 114C may identify the display 106C as a model that is known not to include any components for audio signal processing. Upon reception up the characteristic 114C, the communications service system 104 may enable all of the components 116A-C in order to improve content quality of the content signal 110C. In still a further example, the characteristic 114B may indicate a particular smartphone 106B that is known to have advance video decoders. Upon reception of the characteristic 114B, the communications service system 104 may change an encoding parameter of an encoder to improve the definition of the content signal 110C. In another example, the characteristics 114A-C together may indicate characteristics of all of the output devices 106A-C available to a user.

In addition to adjusting the components 116A-C based on characteristics 112A-C of the input devices 102A-C and characteristics 114A-C of the output devices 106A-C, the communications service system 104 can also adjust the components 116A-C based on subjective feedback 114A-C received from users of the output devices 106A-C. The communications service system 104 may request feedback from the users orally or via a graphical user interface to determine whether the quality of output of the processed content signals 110A-C is high or low or acceptable or not acceptable. In some embodiments, the communications service system 104 may also request the level of quality of the processed content signals 110A-C using, for example, a ranking of one through ten. In some embodiments, the communications service system 104 may also request that the user specify problems with the output of the processed content signals 110A-C by completing a form.

If a user of an output device 106A-C indicates that a processed content signal 110A-C is unacceptable or of low quality, then the communications service system 104 can determine to change the settings of the components 116A-C for that particular output device 106A-C. The communications service system 104 can also determine not to use the settings of the components 116A-C associated with the negative feedback for future communication with an output device sharing the same characteristic as the particular output device 106A-C. For example, if echo cancellation is active in the communications service system 104 and results in negative feedback from the user of smart speaker 106A, the communications service system 104 may default to disabling echo cancellation when another smart speaker of the same model, firmware, brand, or type communicates with the communications service system 104.

The determination to change the settings of the components 116A-C can also be based on positive feedback received from the users of the output devices 106A-C. For example, if a user of a particular output device 106A-C provides positive feedback, the communications service system 104 can determine to use the settings of the components 116A-C associated with the positive feedback as default settings for future communication with an output device sharing the same or similar characteristic as the particular output device 106A-C. For example, if a lighting filter is active in the communications service system 104 and results in positive feedback from the user of display 106C, the communications service system 104 may default to enabling a lighting filter when another display of the same or similar model, firmware, brand, or type is communicating with the communications service system 104.

The determination to change the settings of the components 116A-C can also be based on objective feedback determined by the analyzing component 118. For example, if the analyzing component 118 determines that one of the processed content signals 110A-C is unacceptable or of low quality, then the communications service system 104 can determine to change the settings of the components 116A-C. The communications service system 104 can also determine not to use the settings of the components 116A-C associated with the unacceptable or low quality for future communication with an input device sharing the same or similar characteristic as the particular input device 102A-C that provided the input content signal 108A-C. Communications service system 104 may default to disabling echo cancellation when another microphone 102A of the same or similar model, firmware, brand, or type is communicating with the communications service system 104.

The determination to change the settings of the components 116A-C can also be based on both subjective feedback 114A-C of the users of the output devices 106A-C and objective feedback determined by the analyzing component 118. In some embodiments, the subjective feedback 114A-C and the objective feedback can be combined using, for example, a weighted sum or other heuristics. To determine whether the processed content signals 110A-C are unacceptable or of low quality, the subjective feedback 114A-C can be weighted relative to the objective feedback. In some embodiments, the subjective feedback 114A-C can be weighed more heavily than the objective feedback. For example, if a user of the smart speaker 106A provides negative feedback 114A regarding the processed content signal 110A whereas the objective feedback of the processed content signal 110A is positive, the processed content signal 110A may be determined to be unacceptable due to the greater weight associated with the subjective feedback 114A. In some embodiments, the weight of the subjective feedback 114A-C can be based on a time duration of the processed content signal 110A-C. For example, the longer the processed content signal 110A-C, the greater the weight associated with feedback 114A-C from the user consuming the processed content signal 110A-C. The communication service system 104 may determine to change the settings of the components 116A-C based on the combined feedback.

The determination to change the settings of the components 116A-C may be based on the combination of the input devices 102A-C providing the content signal 108A-C and the output devices 106A-C receiving the processed content signal 110A-C. For example, the processed content signal 110A may not be of acceptable quality if echo cancellation is enabled by the communication service system 104. This may be because the smart speaker 106A also includes an echo cancellation component or because the microphone 102A includes an echo cancellation component. Because the communications service system 104 may not know which of the microphone 102A or the smart speaker 106A includes the echo cancellation component, the communication service system 104 may determine processing settings based on the combination of the input devices 102A-C and the output devices 106A-C. For example, the communication service system 104 may determine to disable echo cancellation when a microphone of the same or similar model, firmware, brand, or type as the microphone 102A is communicating with a smart speaker of the same or similar model, firmware, brand, or type as the smart speaker 106A via the communications service system 104.

In an example, the determination to change the settings of the components 116A-C may be based on the combination of the input devices 102A-C and the output devices 106A-C at a single location, at a single computing node, or associated with the same user. For example, if a user is speaking into smartphone 102B where microphone 102A is present, echo may result based on both input devices inputting the same voice. Therefore, the communications service system 104 may activate the echo cancellation component when two input devices are active at the same location. In another example, if the microphone 102A is active at the same location as the smart speaker 106A, echo may result based on feedback from the microphone of the smart speaker 106A. Therefore, the communications service system 104 may activate the echo cancellation component when two input devices are active at the same location.

In one example, processing settings may be determined to be default settings when a threshold number of combinations of the input devices 102A-C and the output devices 106A-C provide feedback that is positive. In another example, processing settings may be determined as default settings when the settings are used with positive feedback for greater than the threshold duration of time. In yet another example, only settings that have been used over recent time period may be considered as default settings. For example, the default settings can be based on settings that have been used by combinations of the input devices 102A-C and the output devices 106A over the past month.

In some embodiments, artificial intelligence or a machine learning algorithm can be applied to determine the optimal settings for the processing components 116A-C of the communications service system 104. The artificial intelligence or machine learning algorithm can be trained based on historical data indicating acceptable or unacceptable quality. The artificial intelligence or machine learning algorithm can use the characteristics 112A-C of the input devices 102A-C, the characteristics 114A-C of the output devices 106A-C, the subjective feedback 114A-C received from the users of the output devices 106A-C, the objective feedback determined by the analyzing component 118, and the settings of the components 116A-C to determine optimal settings for different combinations of the input devices 102A-C and the output devices 106A-C as described in greater detail below.

In an embodiment, the communications service system 104 may be implemented on one or more backend servers in the context of the Web services framework. Note, however, that one or more components of the communications service system 104 may be implemented on one or more of the frontend servers. In an embodiment, the communications service system 104 may be exposed as a Web service via a Web service interface that other entities may leverage to perform content processing services, applications, etc.

Embodiments of the communications service system 104 may be implemented according to an architecture that is linearly scalable. Embodiments may be scaled quickly and easily with little or no risk of losing usage information, with minimum or no downtime, and without affecting the latency of the overall system.

Figure 2:
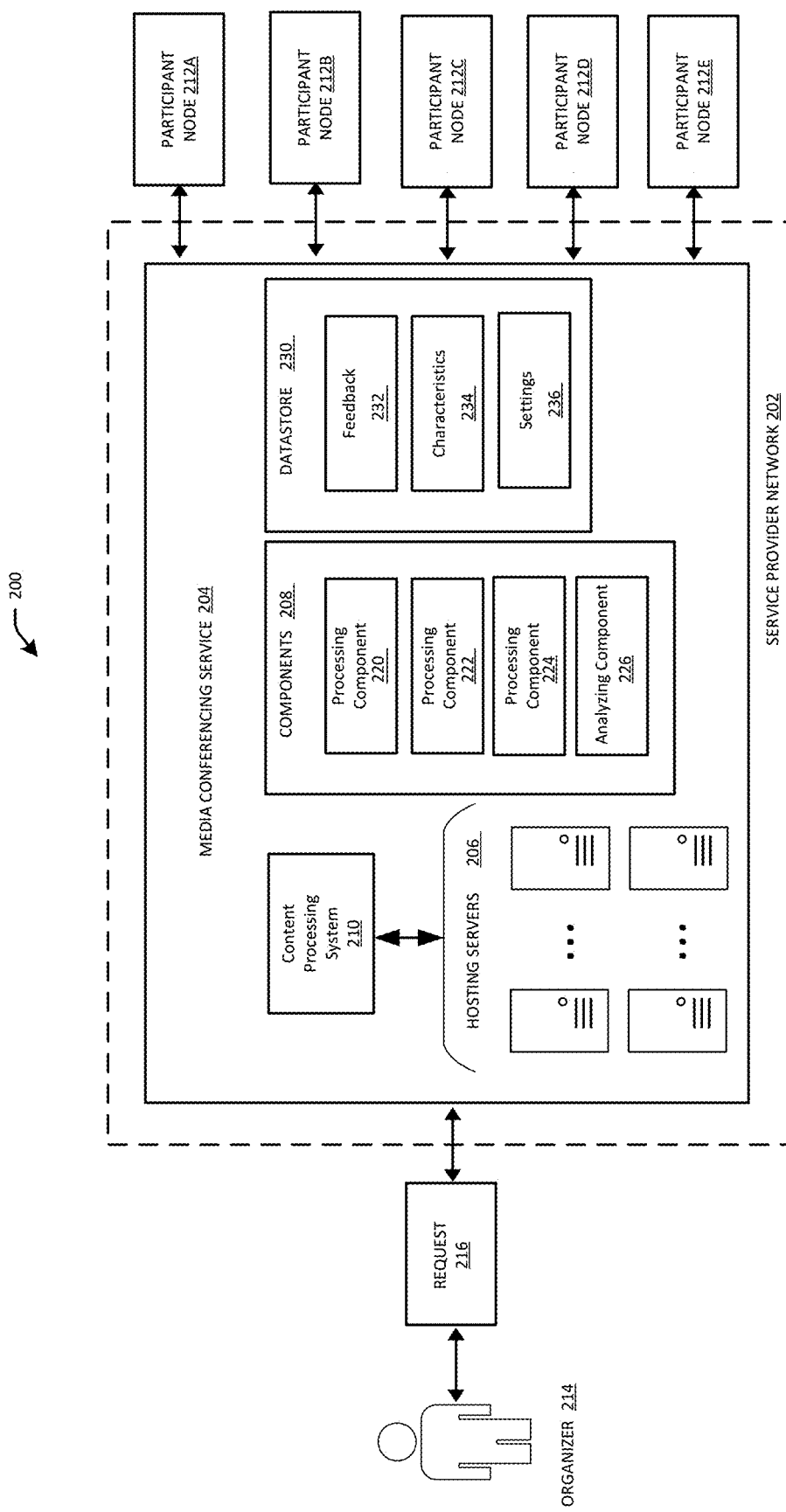
FIG. 2 schematically illustrates a system-architecture diagram of an example service provider network that provides a media conferencing service.

FIG. 2 schematically illustrates an example environment 200 that includes a service provider network 202. The service provider network 202 provides various services to users, such as participant nodes 212A-E, which can be the input devices 102A-C or the output devices 106A-C, or systems including input devices 102A-C or the output devices 106A-C. The service provider network 202 can include various types of computing resources, such as data processing resources like data storage resources, networking resources, data communication resources, network services, and the like. Common expressions associated with the service provider network may include, for example, "on-demand computing," "software as a service (SaaS)," "cloud services," "data centers," and so forth. Services provided by the service provider network 202 may be distributed across one or more physical or virtual devices.

In the example environment 200, the service provider network 202 includes a media conferencing service 204, such as an audio or video conferencing service. The media conferencing service 204 may include multiple hosting servers 206. In some embodiments, the media conferencing service 204 also includes components 208, a content processing system 210, and a datastore 230. The media conferencing service 204 may facilitate initiation of the media conference or may otherwise allow the media conference to take place via hosting servers 206.

Multiple participant nodes 212A-E are illustrated in the example environment 200. The participant nodes 212A-E represent participants, input devices, output devices, clients, bots, and/or users for media conferences provided by the media conferencing service 204. For example, each of the participant nodes 212A-E can be an input device 102A-C or an output device 106A-C, or systems including input devices 102A-C or the output devices 106A-C. The participant nodes 212A-E interact with the media conferencing service 204 and the hosting servers 206 via electronic devices such as, for example, smart phones, tablets, laptop computers, desktop computers, telephones, etc. In some embodiments, at least one of the participant nodes 212A-E maybe a bot that is configured to interact in the video conference instead of a human participant. In configurations, the media conferences may comprise text, audio, and/or video, e.g., one or more of the participant nodes 212A-E may participate in a media conference that includes both audio and video. Text, audio, and/or video content can be sent between the participant nodes 212A-E via the media conferencing service 204. The media conference may be part of a gaming platform.

When one or more of the participant nodes 212A-E wishes to participate in a media conference, an organizer 214 of the media conference may send a request 216 for the media conference to the media conferencing service 204. The organizer 214 may also be a participant in the media conference. Content processed by the media conferencing service 204 can be broadcast to one or more of the participant nodes 212A-E simultaneously.

The processing component 220 can correspond to the processing component 116A, the processing component 222 can correspond to the processing component 116B, the processing component 224 can correspond to the processing component 116C, and the analyzing component 226 can correspond to the analyzing component 118. Each processing component 220, 222, 224 can process a content signal in a different way. For example, processing component 220 can be a noise suppression filter, processing component 222 can be an echo cancellation filter, and processing component 224 can be an encoder. The processing components 220, 222, 224 can process the content signal using the content processing system 210 in serial or in parallel.

Information from the content processing system 210 can be sent to the datastore 230, or information can be sent from the datastore 230 to the content processing system 210. For example, the datastore 230 can include a feedback database 232 received from the participant nodes 212A-E, which may correspond to subjective feedback 114A-C and/or objective feedback determined by analyzing component 118. The datastore 230 can also include characteristics database 234 received from the participant nodes 212A-E, which may correspond to input device characteristics 112A-C and output device characteristics 114A-C, or combinations of input device characteristics 112A-C and output device characteristics 114A-C. The datastore 230 can also include settings 236 for the processing components 220, 222, 224, such as whether to enable or disable the processing components 220, 222, 224 or parameters of the processing components 220, 222, 224. The settings 236 can be associated with the characteristics 234, such that the media conferencing service 204 can select appropriate settings for the processing components to 220, 222, 224 based on the characteristics of each of the participant nodes 212A-E.

The feedback 232, the characteristics 234, and the settings 236 may be stored in one or more databases stored on the datastore 230. In an embodiment, the feedback 232, the characteristics 234, and the settings 236 may be partitioned into three or more partitions in the datastore 230 such that the feedback 232 may be stored in one partition, the characteristics 234 may be stored in another partition, and the settings 236 may be stored in a third partition.

Figure 3:
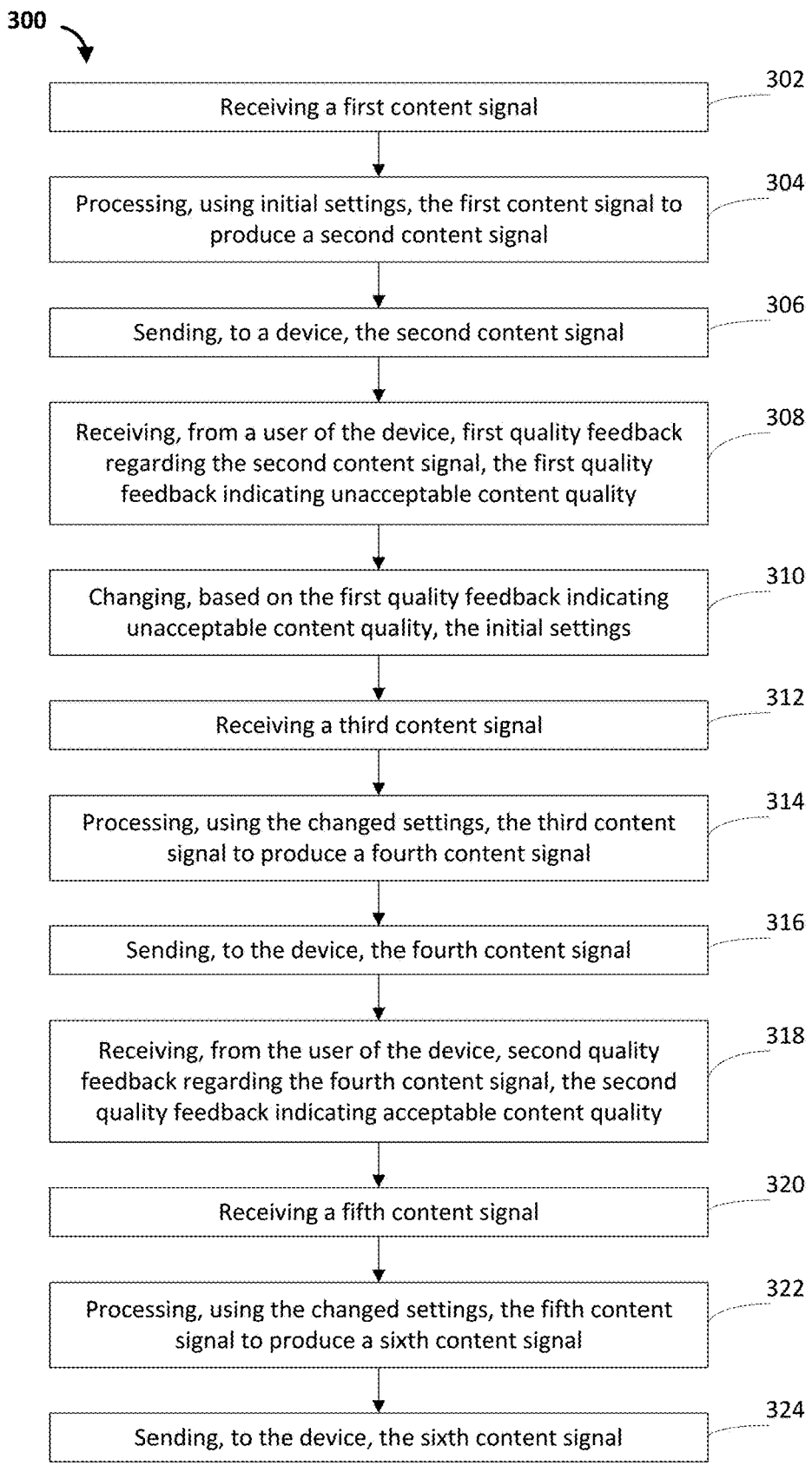
FIG. 3 is a flowchart showing an example process for setting content processing components for network services based on feedback.

FIG. 3 illustrates a flow diagram of an example method 300 that illustrates aspects of the functions performed at least partly by the service provider network 202. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 3, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

The example method 300 may be implemented for setting content processing components for network services based on feedback. For example, the method 300 may be implemented to configure the content signal processing components 116A-C based on feedback received from users of the output devices 106A-C and objective feedback from the content signal analyzing component 118. Additionally, the method 300 may be implemented to configure the processing components 220, 222, 224 based on feedback received from the participant nodes 212A-E and the analyzing component 226.

At block 302, a first content signal is received. The first content signal can be received from an input device 102A-C or a participant node 212A-E. The first content signal can be, for example, one of the received content signals 108A-C. The first content signal can be received following the establishment of a network service between the organizer 214 and one of more of the participant nodes 212A-M, or only between the participant nodes 212A-M. The network service can include audio conferencing, video conferencing, chatting, or gaming service. The first content signal can transmit audio data or video data as part of the media conference.

Before or while receiving the first content signal, the media conferencing service 204 can also receive one or more characteristics of the input device transmitting the first content signal, such as characteristics 112A-C. The one or more characteristics may be unique identifiers of the input device, identifiers of the make and/or model of the input device, identifiers of the firmware version of the input device, identifiers of the type of the input device, and/or indicators of whether the input device has certain components. The one or more characteristics may also include a type of connectivity of the input device to the media conferencing service 204.

Before or while receiving the first content signal, the media conferencing service 204 can also receive one or more characteristics of the output device that will output the first content signal, such as characteristics 114A-C. The one or more characteristics may be unique identifiers of the output device, identifiers of the make and/or model of the output device, identifiers of the firmware version of the output device, identifiers of the type of the output device, and/or indicators of whether the output device has certain components. The one or more characteristics may also include a type of connectivity of the output device to the media conferencing service 204.

The one or more characteristics of the input device and/or the one or more characteristics of the output device can then be compared to the characteristics 234 stored in the datastore 230 to identify initial settings for the processing components 220, 222, 224 from the settings database 236 for devices with matching characteristics. If the one or more characteristics of the input device and/or the one or more characteristics of the output device are not present in the characteristics 234 stored in the datastore 230, then default settings can be used as the initial settings for the processing components 220, 222, 224.

Figure 4A:
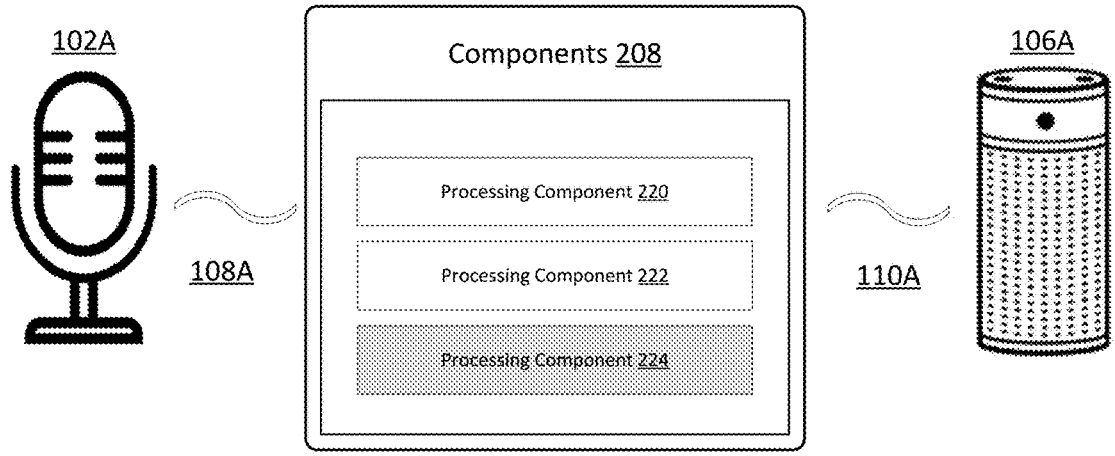
FIGS. 4A-C schematically illustrate changing settings for processing content signals.

At block 304, the first content signal can be processed using the initial settings for the processing components 220, 222, 224 to produce a second content signal. The second content signal can be, for example, one of the processed content signals 110A-C. The first content signal can be processed using the content processing system 210 via the hosting servers 206. In one example illustrated in FIG. 4A, the input device is the microphone 102A and the output device is the smart speaker 106A. The first signal can be the content signal 108A from the microphone 102A that is sent to the media conferencing service 204. The second signal can be the processed content signal 110A. The initial settings may enable the first processing component 220 and the second processing component 222 while disabling the third processing component 224, shown in grey as disabled. These initial settings may be retrieved from the settings database 236 or may be default settings for an audio media conference programmed in the media conferencing service 204.

At block 306, the second content signal is sent to a device. The device may be an output device, such as the output devices 106A-C. In the example illustrated in FIG. 4A, the output device is the smart speaker 106A which receives content signal 110A from the media conferencing service 204.

At block 308, first quality feedback regarding the second content signal is received from a user of the device. The first quality feedback can be subjective feedback received from the user that is consuming the second content signal using the device. In the example illustrated in FIG. 4A, the user can be listening to the second content signal via the smart speaker 106A. The first quality feedback can be received from the user orally via a microphone of the smart speaker 106A, via an input on the smart speaker 106A, or via a mobile device of the user to determine whether the quality of output of the second content signal is acceptable or not acceptable. The input, such as a graphical user interface, can illustrate, for example, a thumbs up or a thumbs down, or a "yes" or "no" for selection by the user. In some embodiments, the first quality feedback may also include the level of quality using, for example, a ranking of one through ten.

In some embodiments, the first quality feedback may also include specific problems with the output of the second content signal.

In some embodiments, the first quality feedback can also include objective feedback determined by the analyzing component 226. The analyzing component 226 can objectively determine the quality of a processed content signal by analyzing the shape of the signal, the digitization of the signal, the bit rate of the signal, etc. In some embodiments, the first quality feedback can be a combination of the subjective feedback and the objective feedback that are combined using, for example, a weighted sum or other heuristics. As explained above, in some embodiments, the subjective feedback can be weighed more heavily than the objective feedback and the weight can be increased for the subjective feedback based on a duration of the second content signal.

In some embodiments, the user may indicate that the quality of output of the second content signal is unacceptable. In some embodiments, if the components 220 and 222 used to process the first content signal were redundant with components included in the input device and/or the output device, the quality of the second content signal may be unacceptable. As such the first quality feedback may indicate unacceptable or low content quality.

Figure 4B:
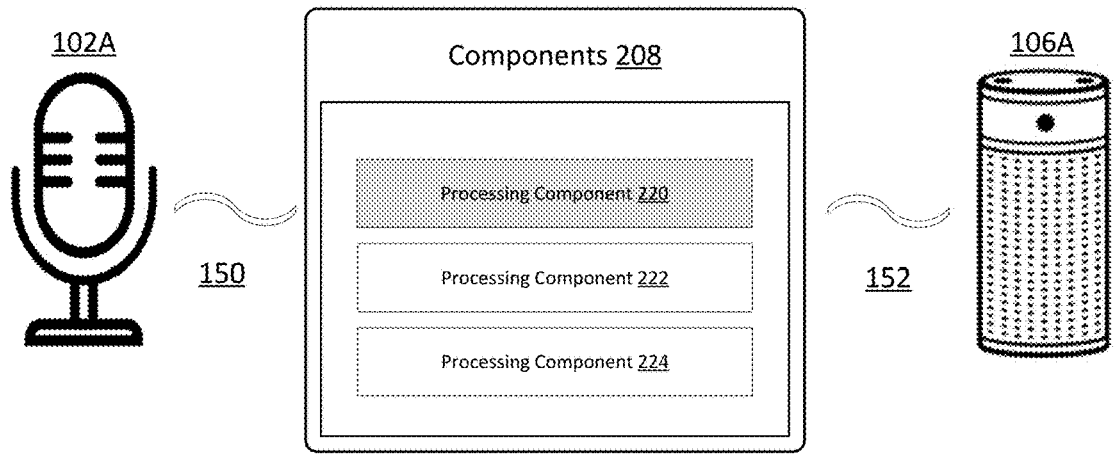

At block 310, the media conferencing service 204 may change at least one of the initial settings for the processing components 220, 222, 224 based on the first quality feedback indicating unacceptable or low quality content. For example, as illustrated in FIG. 4B, component 220 can be disabled and component 224 can be enabled, while maintaining component 222 as enabled, to improve the quality of the content processing. In some embodiments, the changes to component 220 and component 224 can be based on prior successful changes for input devices and output devices of the same or similar type or the same or similar brand. In some embodiments, the changes to component 220 and component 224 can be based on programmed steps to improve the quality of the content processing. For example, the media conferencing service 204 may be programmed to disable component 220 as a first step following feedback indicating unacceptable or low quality content.

At block 312, a third content signal is received. The third content signal can be received from an input device 102A-C or a participant node 212A-E. The third content signal can be received from the same input device as the first content signal or from a different input device. Before or while receiving the third content signal, the media conferencing service 204 can also receive one or more characteristics of the input device and/or one or more characteristics of the output device if the input device and/or the output device have changed. In the example illustrated in FIG. 4B, the third content signal 150 is received from the same microphone 102A and the output device is the same smart speaker 106A. The third content signal is received after the first content signal is received.

At block 314, the third content signal can be processed using the changed settings for the processing components 220, 222, 224 to produce a fourth content signal. The fourth content signal can be, for example, one of the processed content signals 110A-C. The third content signal can be processed using the content processing system 210 via the hosting servers 206. In one example illustrated in FIG. 4B, the third content signal 150 can be processed by the second processing component 222 and the third processing component 224 while the first processing component 220, shown in grey, is disabled. Following the content processing, the fourth signal 152 is generated.

At block 316, the fourth content signal is sent to the device. The device may be an output device, such as the output devices 106A-C. In the example illustrated in FIG. 4B, the output device is the smart speaker 106A which receives content signal 152 from the media conferencing service 204.

At block 318, second quality feedback regarding the fourth content signal is received from the user of the device. The first quality feedback can be subjective feedback received from the user that is consuming the fourth content signal using the device. The user consuming the fourth content signal can be the same user that consumes the second content signal. In the example illustrated in FIG. 4B, the user can be listening to the fourth content signal via the smart speaker 106A. The second quality feedback can be received from the user orally via a microphone of the smart speaker 106A, via an input on the smart speaker 106A, or via a mobile device of the user to determine whether the quality of output of the fourth content signal is acceptable or not acceptable. The graphical user interface can illustrate, for example, a thumbs up or a thumbs down, or a "yes" or "no" for selection by the user. In some embodiments, the second quality feedback may also include the level of quality using, for example, a ranking of one through ten. In some embodiments, the second quality feedback may also include specific problems with the output of the fourth content signal.

In some embodiments, the user may indicate that the quality of output of the fourth content signal is acceptable. In some embodiments, if the components 222 and 224 used to process the first content signal were not redundant with components included in the input device and/or the output device, the quality of the fourth content signal may be acceptable. As such the first quality feedback may indicate acceptable or high content quality.

In response to the determination that the changed settings of the processing components 220, 222, 224 result in acceptable or high quality content, the media conferencing service 204 may store the changed settings in the settings database 236 and may associate the changed settings with the characteristics of the input device and the output device that are stored in the characteristics database 234. As such, if another input device and/or output device sharing the same or similar characteristics connects to the media conferencing service 204, the initial settings for the processing components 220, 222, 224 may be the changed settings determined at block 310 that are retrieved from the settings database 236 resulting in an optimal user experience from the start of the media conference.

At block 320, a fifth content signal is received. The fifth content signal can be received from an input device 102A-C or a participant node 212A-E. The fifth content signal can be received from the same input device as the first content signal or from a different input device. Before or while receiving the third content signal, the media conferencing service 204 can also receive one or more characteristics of the input device and/or one or more characteristics of the output device if the input device and/or the output device have changed. In the example illustrated in FIG. 4C, the fifth content signal 160 is received from a headset 102D and the output device is the same smart speaker 106A. The fifth content signal is received after the first content signal is received.

Before or while receiving the fifth content signal, the media conferencing service 204 can also receive one or more characteristics of the input device, such as the headset 102D, transmitting the fifth content signal and/or one or more characteristics of the output device, such as the smart speaker 106A. The one or more characteristics may be unique identifiers of the input device, identifiers of the make and/or model of the input device, identifiers of the firmware version of the input device, identifiers of the type of the input device, and/or indicators of whether the input device has certain components. The one or more characteristics may also include a type of connectivity of the input device to the media conferencing service 204.

Figure 4C:
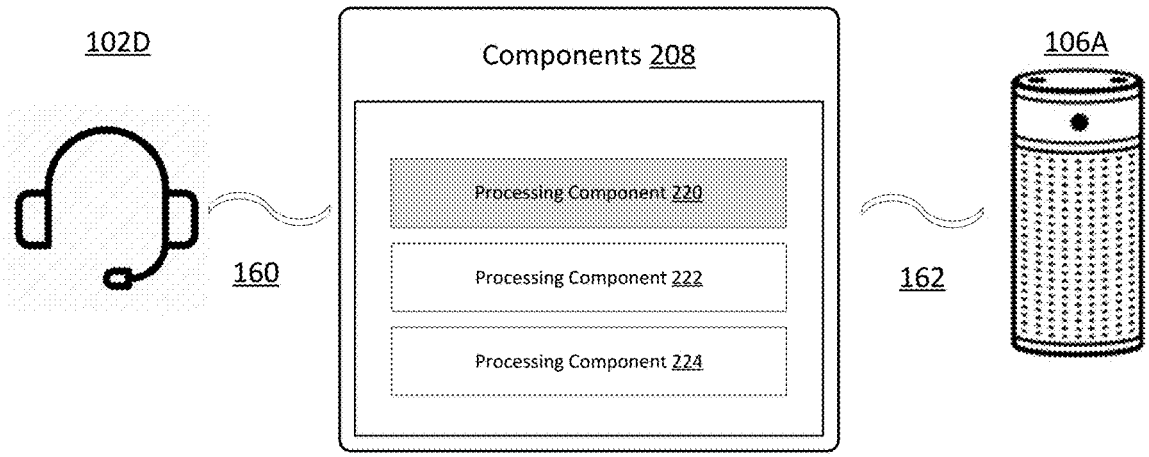

The one or more characteristics of the input device and/or the one or more characteristics of the output device can then be compared to the characteristics database 234 stored in the datastore 230. In the example of FIG. 4C, the closest device pairing to the headset 102D and the smart speaker 106A in the settings database 236 may be the pairing of the microphone 102A and the smart speaker 106A. Therefore, the changed characteristics used to process the third content signal may be received from the characteristics database 234 stored in the datastore 230 as initial settings for processing the fifth content signal.

At block 322, the fifth content signal can be processed using the changed settings for the processing components 220, 222, 224 to produce a sixth content signal. The sixth content signal can be, for example, one of the processed content signals 110A-C. The sixth content signal can be processed using the content processing system 210 via the hosting servers 206. In one example illustrated in FIG. 4C, the sixth signal 160 can be processed by the second processing component 222 and the third processing component 224 while the first processing component 220, shown in grey, is disabled. Following the content processing, the sixth signal 162 is generated.

At block 316, the sixth content signal is sent to the device. The device may be an output device, such as the output devices 106A-C. In the example illustrated in FIG. 4B, the output device is the smart speaker 106A which receives content signal 162 from the media conferencing service 204.

Figure 5:
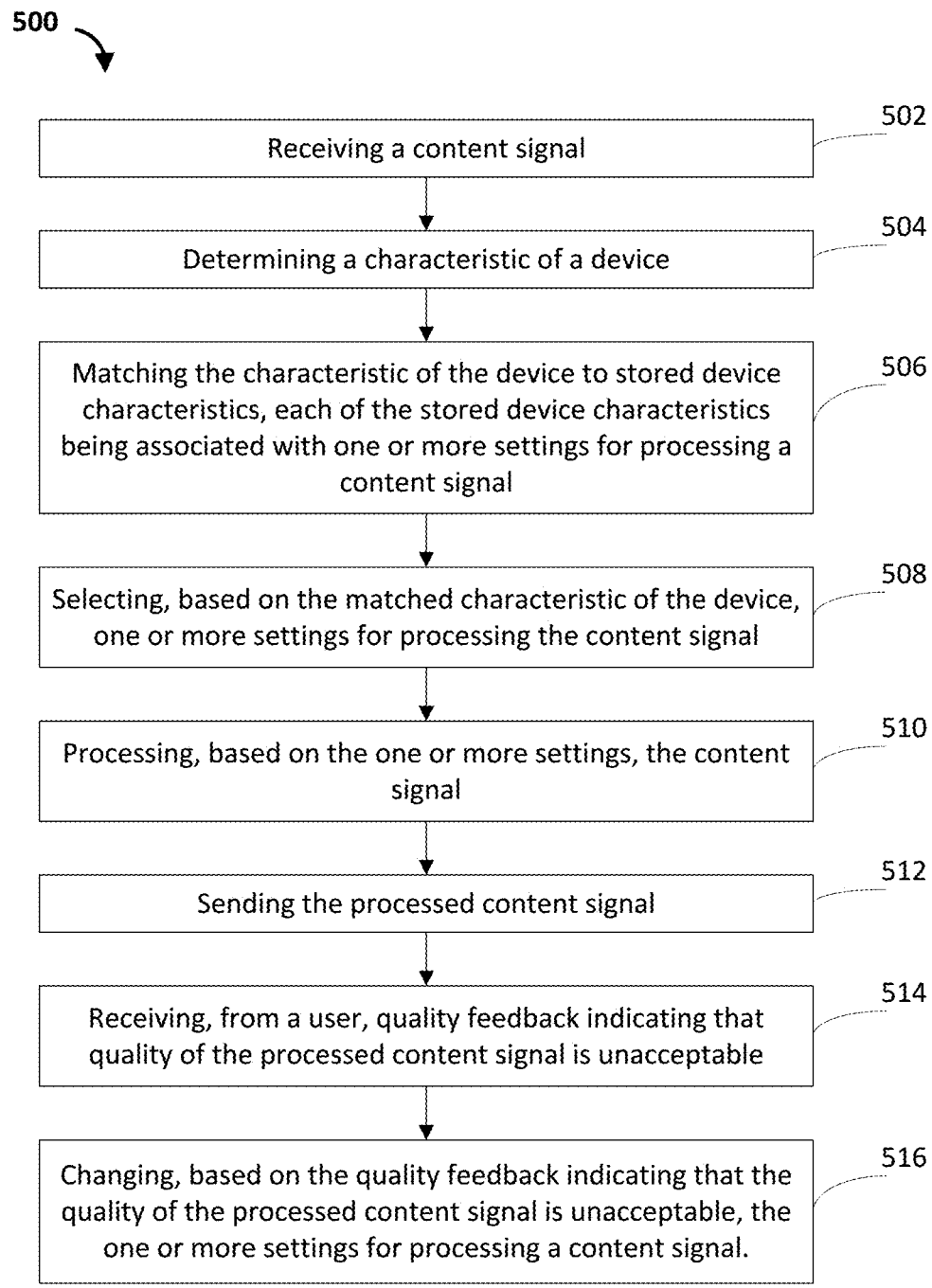
FIG. 5 is a flowchart showing an example process for setting content processing components for network services based on feedback according to another embodiment.

FIG. 5 illustrates a flow diagram of an example method 500 that illustrates aspects of the functions performed at least partly by the service provider network 202. The logical operations described herein with respect to FIG. 5 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 5, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

The example method 500 may be implemented for setting content processing components for network services based on feedback according to another embodiment. For example, the method 500 may be implemented to configure the content signal processing components 116A-C based on feedback received from users of the output devices 106A-C and objective feedback from the content signal analyzing component 118. Additionally, the method 500 may be implemented to configure the processing components 220, 222, 224 based on feedback received from the participant nodes 212A-E and the analyzing component 226.

At block 502, a content signal is received. The content signal can be received from an input device 102A-C or a participant node 212A-E. The content signal can be, for example, one of the received content signals 108A-C. The content signal can be received following the establishment of a network service between the organizer 214 and one or more of the participant nodes 212A-M, or only between the participant nodes 212A-M. The network service can include audio conferencing, video conferencing, chatting, or gaming service. The content signal can transmit audio data or video data as part of the media conference.

At block 504, a characteristic of a device can be determined. The device can be an input device 102A-C or an output device 106A-C. Before or while receiving the content signal, the media conferencing service 204 can also receive the characteristic. The characteristic may be a unique identifier of the input device, an identifier of the make and/or model of the input device, an identifier of the firmware version of the input device, an identifier of the type of the input device, and/or an indicator of whether the input device has certain components. The one or more characteristics may also include a type of connectivity of the input device to the media conferencing service 204.

In addition, before or while receiving the content signal, the media conferencing service 204 can also receive one or more characteristics of the output device that will output the processed content signal. The one or more characteristics may be unique identifiers of the output device, identifiers of the make and/or model of the output device, identifiers of the firmware version of the output device, identifiers of the type of the output device, and/or indicators of whether the output device has certain components. The one or more characteristics may also include a type of connectivity of the output device to the media conferencing service 204.

At block 506, the characteristics of the device can be matched to stored device characteristics. The one or more characteristics of the input device and/or the one or more characteristics of the output device can be compared to the characteristics 234 stored in the datastore 230. In some embodiments, only the characteristic of the output device can be matched to the stored device characteristics, only the characteristic of the input device can be matched the stored device characteristics, or characteristics of a combination of the input device and the output device can be matched to stored device characteristics. Upon a match, settings for the processing components 220, 222, 224 that are associated with the characteristics of the input device, the output device, or a combination of the input device and the output device, can be retrieved from the settings database 236.

At block 508, one or more of the settings for processing the content signal are selected based on the matched characteristic of the device. The settings can be based on prior media conferences in which the users indicated acceptable or high content quality using an input device and/or an output device sharing the same characteristics as the device. For example, if a user in a prior media conference with acceptable content quality used an output device sharing a characteristic with the device, the settings for that prior media conference can be retrieved from the settings database 236 stored in the datastore 230 for the present media conference.

At block 510, the content signal can be processed using the one or more settings for the processing components 220, 222, 224 to produce a processed content signal. The processed content signal can be, for example, one of the processed content signals 110A-C. The content signal can be processed using the content processing system 210 via the hosting servers 206.

At block 512, the processed content signal is sent. The processed content signal can be sent to one or more output devices, such as the output devices 106A-C. For example, in a media conference where content is broadcast to a plurality of output devices, the one or more settings for the processing components 220, 222, 224 for each output device can be different while all of the output devices are receiving the content simultaneously. In particular, the processing settings for each output device is customized so that the users of all the output devices experience acceptable or high quality output.

In some embodiments, in order to prevent a high cost for processing the content, the content processing system 210 can use only one setting for the processing components 220, 222, 224. The setting can be selected to provide the best average quality for all of the input devices 102A-C and the output devices 106A-C participating in the media conference.

At block 514, quality feedback regarding the processed content signal is received from a user. The quality feedback can be subjective feedback received from the user that is consuming the processed content signal. In some embodiments, the quality feedback may also include the level of quality using, for example, a ranking of one through ten. In some embodiments, the quality feedback may also include specific problems with the output of the processed content signal. In some embodiments, the quality feedback can also include objective feedback determined by the analyzing component 226. The analyzing component 226 can objectively determine the quality of a processed content signal by analyzing the shape of the signal, the digitization of the signal, the bit rate of the signal, etc. In some embodiments, first quality feedback can be a combination of the subjective feedback and the objective feedback that are combined using, for example, a weighted sum or other heuristics. The quality of output of the processed content signal may be indicated as being low.

At block 516, at least one of the settings for the processing components 220, 222, 224 can be changed based on the quality feedback indicating unacceptable or low quality content. For example, one or more of the processing components 220, 222, 224 can be enabled or disabled and/or parameters for the processing components 220, 222, 224 can be adjusted. The changed settings can be stored in the settings database 236 and used for future media conferences with devices sharing a characteristic with the device.

Figure 6:
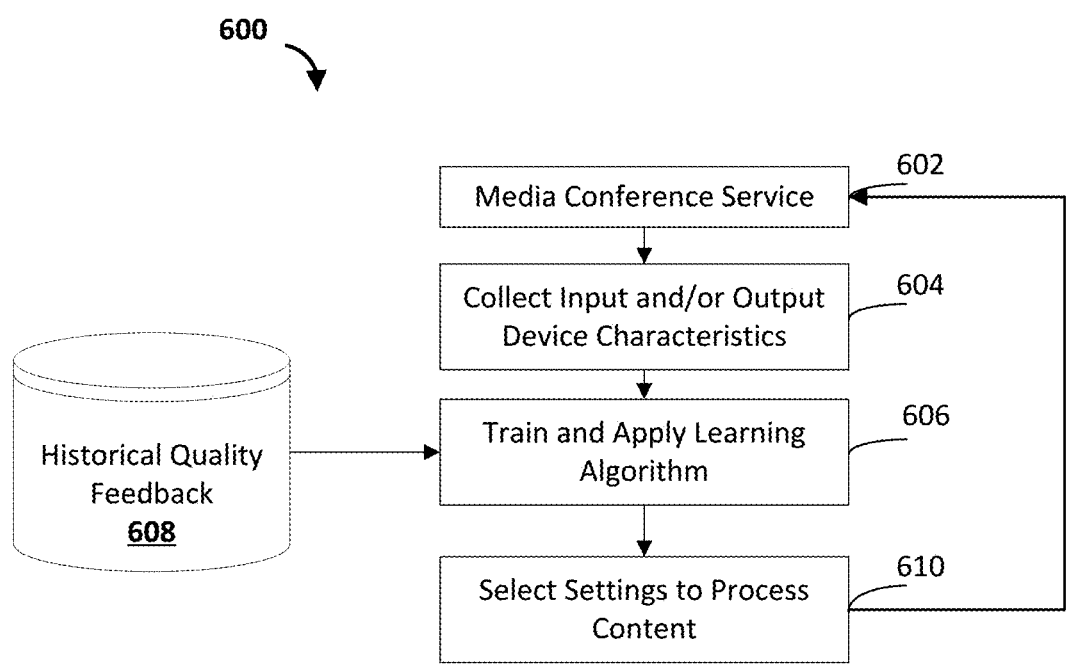
FIG. 6 is a flowchart showing an example process for training a learning algorithm to select settings for processing content for processing content signals.

FIG. 6 is a flowchart showing an example process 600 for training a learning algorithm to select settings for processing content. The logical operations described herein with respect to FIG. 6 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 6, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

At block 602, a media conference is hosted by the hosting servers 206. As part of the media conference, a plurality of content signals are received from one or more input devices, processed, and sent to one or more output devices.

At block 604, at the initiation or during the media conference, characteristics of the input devices and/or the output devices can be collected by the service provider network 202. All of the device characteristics can be stored in the characteristics database 234 in the datastore 230.

At block 606, the quality feedback being collected in real time and the historical quality feedback 608 stored in the feedback database 232 in the datastore 230 can be used to continually train a learning algorithm, such as a machine learning algorithm, artificial intelligence algorithm, and/or other statistical modeling algorithm. The learning algorithm can be trained to determine optimal processing settings for different types of content signals based on characteristics of devices. The historical quality feedback 608 can be subjective feedback indicating acceptable quality, high quality, unacceptable quality, low quality, etc., that is associated with characteristics of the device used by the user. The historical quality feedback 608 can also include objective feedback determined by the analyzing component 226 that is associated with characteristics of the device used by the user.

At block 610, the learning algorithm can be used to select optimal settings to process content signals. This analysis can be continually done such that, as new feedback is collected during the network service, the optimal processing settings may change or migrate for the devices.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 3, 5, and 6, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

Figure 7:
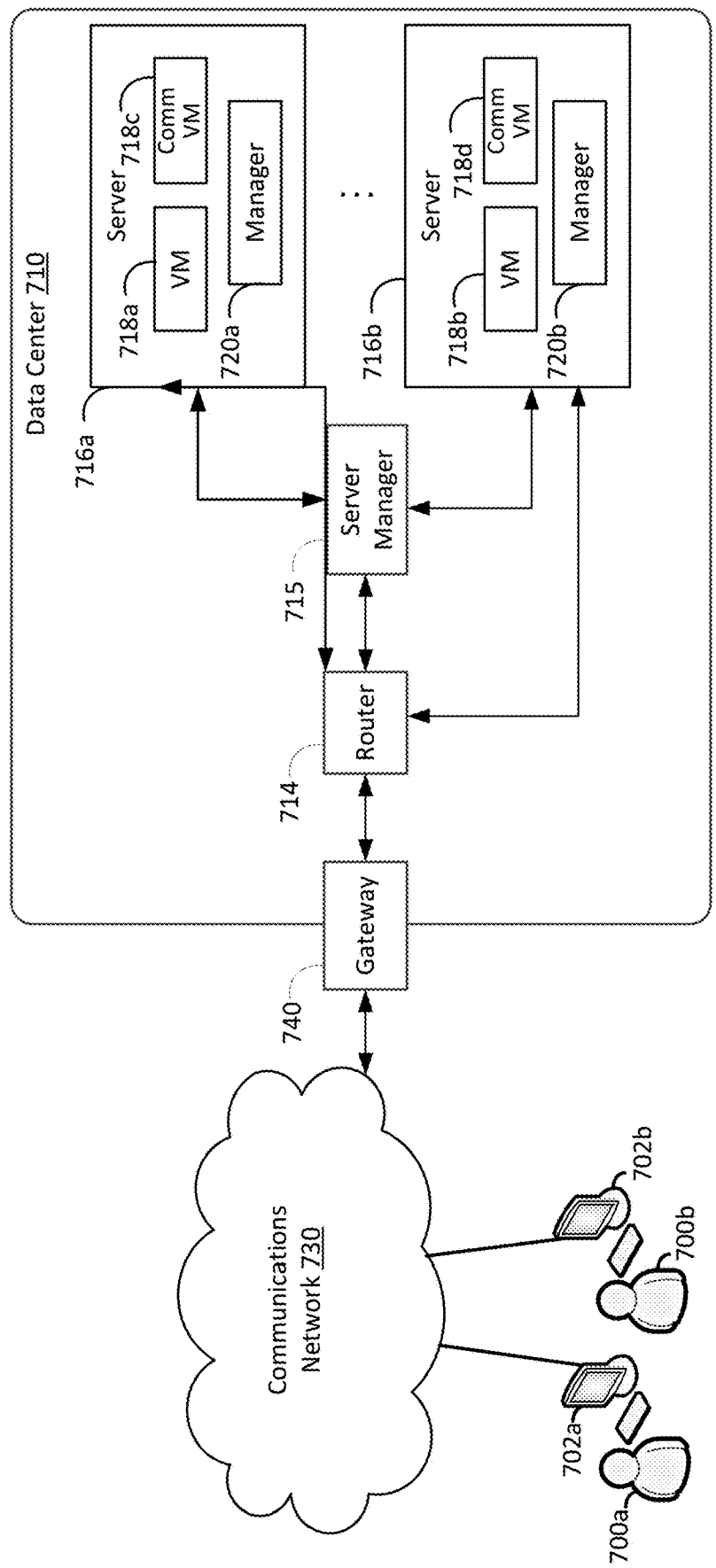
FIG. 7 is a diagram illustrating an example computing environment that may be used in some embodiments.

FIG. 7 illustrates an example computing environment in which the embodiments described herein may be implemented. The example computing environment of FIG. 7 may be configured to implement one or more of the services, such as the communications services 104 of FIG. 1 and/or the media conferencing service 204 of FIG. 2. The example computing environment of FIG. 7 may be configured to implement any of the methods described herein, such as any methods (e.g., or any operations) associated with FIGS. 3, 5, and 8.

FIG. 7 is a diagram schematically illustrating an example of a data center 710 that can provide computing resources to users 700a and 700b (which may be referred herein singularly as user 700 or in the plural as users 700) via user computers 702a and 702b (which may be referred herein singularly as computer 702 or in the plural as computers 702) via a communications network 730. Data center 710 may be configured to provide computing resources for executing applications on a permanent or an as-needed basis. The computing resources provided by data center 710 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 710 may include servers 716a-b (which may be referred herein singularly as server 716 or in the plural as servers 716) that provide computing resources. These resources may be available as bare metal resources, or as virtual machine instances 718a-d and (which may be referred herein singularly as virtual machine instance 718 or in the plural as virtual machine instances 718). Virtual machine instances 718c and 718d can be communication service virtual machine. The communication service virtual machine instances 718c and 718d may be configured to perform all or any portion of the communication services (e.g., contact center services, virtual environment services, determining virtual features, facilitating communication sessions, content services for accessing virtual environments) in accordance with the present disclosure and described in detail herein. As should be appreciated, while the particular example illustrated in FIG. 7 includes one communication service virtual machine in each server, this is merely an example. A server may include more than one communication service virtual machine or may not include any communication service virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 7, communications network 730 may, for example, be a publicly accessible network of linked networks and possibly operated by various distinct parties, such as the Internet. In other embodiments, communications network 730 may be a private network, such as, a corporate or university network that is wholly or partially inaccessible to non-privileged users. In still other embodiments, communications network 730 may include one or more private networks with access to and/or from the Internet.

Communication network 730 may provide access to computers 702. User computers 702 may be computers utilized by users 700 or other customers of data center 710. For instance, user computer 702a or 702b may be a server, a desktop or laptop personal computer, a tablet computer, a wireless telephone, a personal digital assistant (PDA), an e-book reader, a game console, a set-top box or any other computing device capable of accessing data center 710. User computer 702a or 702b may connect directly to the Internet (e.g., via a cable modem or a Digital Subscriber Line (DSL)). Although only two user computers 702a and 702b are depicted, it should be appreciated that there may be multiple user computers.

User computers 702 may also be utilized to configure aspects of the computing resources provided by data center 710. In this regard, data center 710 might provide a gateway or web interface through which aspects of its operation may be configured through the use of a web browser application program executing on user computer 702. Alternately, a stand-alone application program executing on user computer 702 might access an application programming interface (API) exposed by data center 710 for performing the configuration operations. Other mechanisms for configuring the operation of various web services available at data center 710 might also be utilized.

Servers 716 shown in FIG. 7 may be standard servers configured appropriately for providing the computing resources described above and may provide computing resources for executing one or more web services and/or applications. In one embodiment, the computing resources may be virtual machine instances 718. In the example of virtual machine instances, each of the servers 716 may be configured to execute an instance manager 720a or 720b (which may be referred herein singularly as instance manager 720 or in the plural as instance managers 720) capable of executing the virtual machine instances 718. The instance managers 720 may be a virtual machine monitor (VMM) or another type of program configured to enable the execution of virtual machine instances 718 on server 716, for example. As discussed above, each of the virtual machine instances 718 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 710 shown in FIG. 7, a router 714 may be utilized to interconnect the servers 716a and 716b. Router 714 may also be connected to gateway 740, which is connected to communications network 730. Router 714 may be connected to one or more load balancers, and alone or in combination may manage communications within networks in data center 710, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 710 shown in FIG. 7, a server manager 715 is also employed to at least in part direct various communications to, from and/or between servers 716a and 716b. While FIG. 7 depicts router 714 positioned between gateway 740 and server manager 715, this is merely an exemplary configuration. In some cases, for example, server manager 715 may be positioned between gateway 740 and router 714. Server manager 715 may, in some cases, examine portions of incoming communications from user computers 702 to determine one or more appropriate servers 716 to receive and/or process the incoming communications. Server manager 715 may determine appropriate servers to receive and/or process the incoming communications based on factors such as an identity, location or other attributes associated with user computers 702, a nature of a task with which the communications are associated, a priority of a task with which the communications are associated, a duration of a task with which the communications are associated, a size and/or estimated resource usage of a task with which the communications are associated and many other factors. Server manager 715 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 710 described in FIG. 7 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, videogame consoles, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 8:
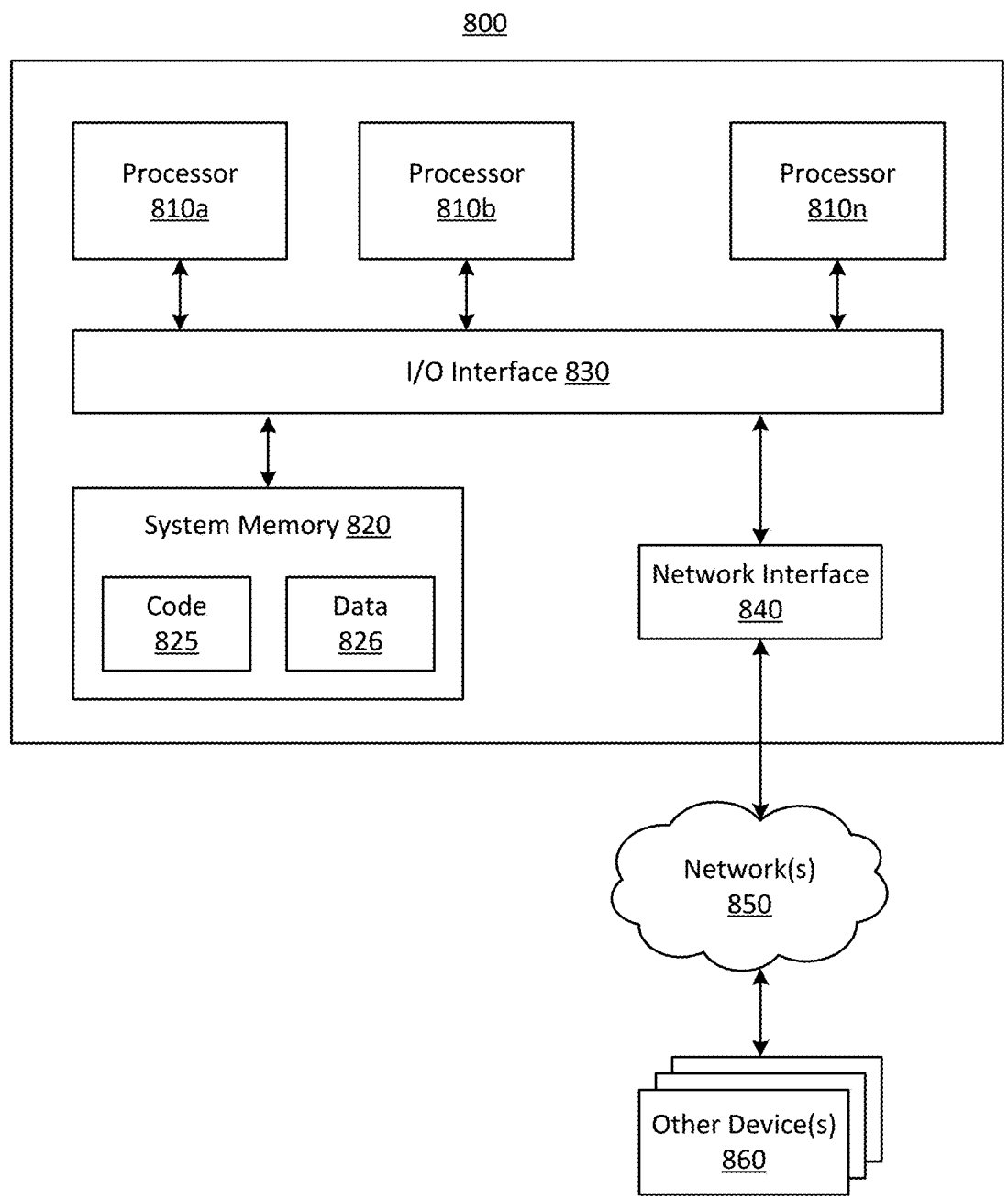
FIG. 8 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. The example computer system of FIG. 8 may be configured to implement the communications services 104 of FIG. 1 and/or the media conferencing service 204, the organizer 214, the participant nodes 212A-E, or a combination thereof of FIG. 2. The example computer system of FIG. 8 may be configured to implement any of the methods described herein, such as any methods (e.g., or any operations) associated with FIGS. 3, 5, and 8.

In the illustrated embodiment, computing system 800 includes one or more processors 810a, 810b and/or 810n (which may be referred herein singularly as "a processor 810" or in the plural as "the processors 810") coupled to a system memory 820 via an input/output (I/O) interface 830. Computing system 800 further includes a network interface 840 coupled to I/O interface 830.

In various embodiments, the computing system 800 may be a uniprocessor system including one processor 810 or a multiprocessor system including several processors 810 (e.g., two, four, eight or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC or MIPS ISAs or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 820 as code 825 and data 826.

In an embodiment, I/O interface 830 may be configured to coordinate I/O traffic between processor 810, system memory 820 and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing system 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fiber Channel SANs (storage area networks) or via any other suitable type of network and/or protocol.

In some embodiments, system memory 820 may be a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing system 800 via I/O interface 830. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing system 800 as system memory 820 or another type of memory. Further, a computer-accessible medium may include transmission media or signals such as electrical, electromagnetic or digital signals conveyed via a communication medium such as a network and/or a wireless link, such as those that may be implemented via network interface 840. Portions or all of multiple computing devices such as those illustrated in FIG. 8 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing system," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As an example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method comprising:
receiving, from an input device and at a communications service system, a first content signal;
processing, using initial settings of the communications service system, the first content signal to produce a second content signal;
sending, to an output device, the second content signal;
receiving, from a user of the output device, first quality feedback regarding the second content signal, the first quality feedback indicating unacceptable content quality;
changing, based on the first quality feedback indicating unacceptable content quality, the initial settings of the communications service system to produce changed settings of the communications service system;
receiving, at the communications service system, a third content signal;
processing, using the changed settings of the communications service system, the third content signal to produce a fourth content signal;
sending, to the output device, the fourth content signal; and
receiving, from the user of the output device, second quality feedback regarding the fourth content signal, the second quality feedback indicating acceptable content quality.

2. The method of claim 1, further comprising determining third quality feedback associated with the second content signal,
wherein changing the initial settings of the communications service system comprises changing, based on the first quality feedback and the third quality feedback, the initial settings of the communications service system.

3. The method of claim 1, further comprising:
receiving, at the communications service system, a fifth content signal;
processing, using the changed settings of the communications service system, the fifth content signal to produce a sixth content signal; and
sending, to the output device, the sixth content signal.

4. The method of claim 1, wherein changing the initial settings of the communications service system comprises activating or deactivating at least one of the initial settings of the communications service system.

5. The method of claim 1, wherein changing the initial settings of the communications service system comprises adjusting a parameter of at least one of the initial settings of the communications service system.

6. The method of claim 1, wherein changing the initial settings of the communications service system comprises applying predetermined heuristics to the first quality feedback to determine at least one of the initial settings of the communications service system to change.

7. The method of claim 1, wherein changing the initial settings of the communications service system comprises applying machine learning to the first quality feedback to determine at least one of the initial settings of the communications service system to change.

8. The method of claim 1, further comprising determining, based on a characteristic of the input device or a characteristic of the output device, the initial settings of the communications service system.

9. The method of claim 8, wherein determining the initial settings of the communications service system comprises:
receiving the characteristic of the input device or the characteristic of the output device; and
matching the characteristic of the input device or the characteristic of the output device to stored device characteristics, each of the stored device characteristics being associated with one or more settings for processing a content signal; and
selecting the one or more settings as the initial settings of the communications service system.

10. A media conferencing service comprising:
a computing node and a non-transitory computer-readable storage medium, the computer-readable storage medium having stored therein computer-readable instructions that, upon execution by the computing node, configure the media conferencing service to perform operations comprising:
receiving a content signal;
determining a characteristic of a device;
matching the characteristic of the device to stored device characteristics, each of the stored device characteristics being associated with one or more settings for processing a content signal;
selecting the one or more settings for processing the content signal associated with the matched characteristic of the device;
processing, based on the one or more settings, the content signal;
sending the processed content signal;
receiving, from a user, quality feedback indicating that quality of the processed content signal is unacceptable; and
changing, based on the quality feedback indicating that the quality of the processed content signal is unacceptable, the one or more settings for processing a content signal.

11. The media conferencing service of claim 10, wherein the computer-readable instructions upon execution further configure the media conferencing service to associate one or more settings with the device characteristic by:
receiving, from a plurality of users of a plurality of devices sharing the device characteristic, quality feedback indicating content quality; and
determining one or more settings used by the media conferencing service during communication with the plurality of devices.

12. The media conferencing service of claim 10, wherein the computer-readable instructions upon execution configure the media conferencing service to change the one or more settings for processing the content signal by:
activating or deactivating at least one of the one or more settings, or
adjusting a parameter of the one or more settings.

13. The media conferencing service of claim 10, wherein the computer-readable instructions upon execution further configure the media conferencing service to:
determine second quality feedback indicating quality of the processed content signal; and
determine, based on the quality feedback and the second quality feedback, the quality of the processed content signal.

14. The media conferencing service of claim 10, wherein the characteristic of the device comprises at least one of a unique identifier of the device, a model of the device, a firmware version of the device, or a type of the device.

15. The media conferencing service of claim 10, wherein the characteristic of the device comprises characteristics of a plurality of input devices or output devices.

16. The media conferencing service of claim 10, wherein the content signal is an audio signal, and the settings for processing the content signal comprise at least one of a noise cancellation setting, an echo cancellation setting, a reverberation setting, a voice filtering setting, or an audio encoding setting.

17. The media conferencing service of claim 10, wherein the content signal is a video signal, and the settings for processing the content signal comprise at least one of a light setting, a focus setting, a crop setting, a framerate setting, a color setting, a smoothing setting, or a video encoding setting.

18. A non-transitory computer-readable storage medium having stored thereon computer-readable instructions, the computer-readable instructions comprising instructions that, upon execution on one or more computing devices, at least cause:
receiving, from a device, a content signal;
determining a characteristic of the device;
matching the characteristic of the device to stored device characteristics, each of the stored device characteristics being associated with one or more settings for processing a content signal;
selecting the one or more settings for processing the content signal associated with the matched characteristic of the device;
processing, based on the one or more settings, the content signal;
sending the processed content signal;
receiving, from a user, quality feedback indicating that quality of the processed content signal is unacceptable; and
changing, based on the quality feedback indicating that the quality of the processed content signal is unacceptable, the one or more settings for processing a content signal.

19. The computer-readable storage medium of claim 18, wherein the instructions, upon execution on the one or more computing devices, cause associating the one or more settings for processing the content signal with the device characteristic by:
receiving, from a plurality of users of a plurality of devices sharing the device characteristic, quality feedback indicating content quality; and
determining one or more settings used during communication with the plurality of devices.

20. The computer-readable storage medium of claim 18, wherein the instructions, upon execution on the one or more computing devices, cause changing the one or more settings for processing the content signal by:
activating or deactivating at least one of the one or more settings, or
adjusting a parameter of the one or more settings.

* * * * *